April 29, 1969  C. D. KEITH ET AL  3,441,382
CATALYST CARTRIDGE
Filed Jan. 27, 1967
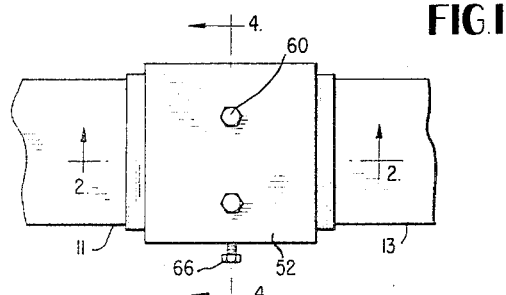
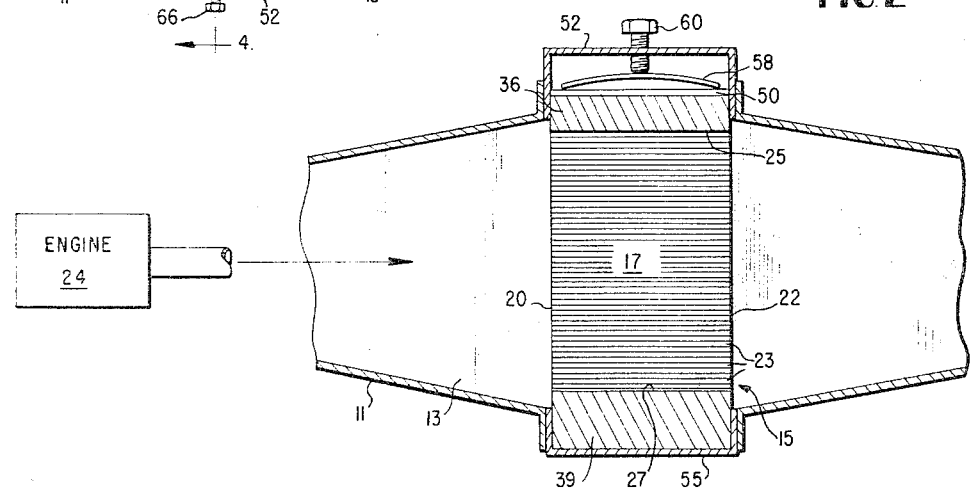
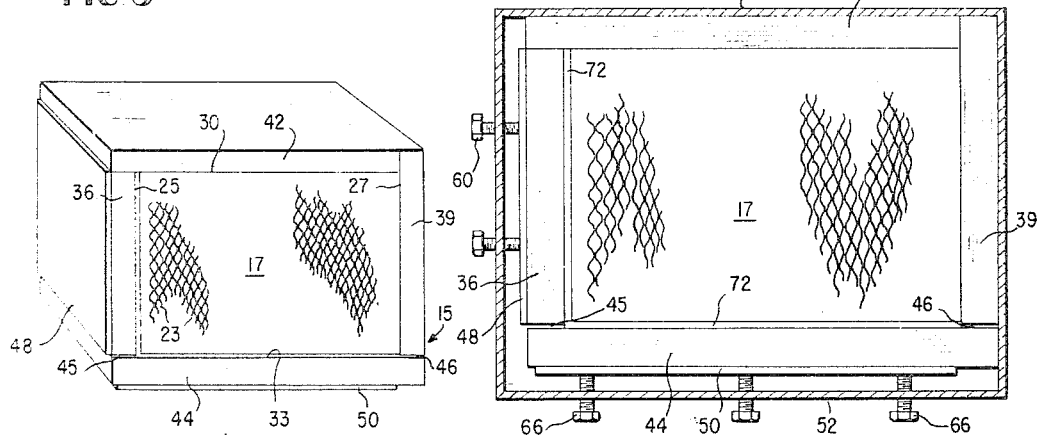
INVENTORS
CARL D. KEITH
TEUNIS SCHREUDERS
BY
ATTORNEYS

United States Patent Office 3,441,382
Patented Apr. 29, 1969

3,441,382
CATALYST CARTRIDGE
Carl D. Keith, Summit, N.J., and Teunis Schreuders, Johannesburg, Transvaal, Republic of South Africa, assignors to Engelhard Industries, Inc., a corporation of Delaware
Continuation-in-part of application Ser. No. 256,856, Feb. 7, 1963. This application Jan. 27, 1967, Ser. No. 612,134
Int. Cl. B01j 9/20, 11/06
U.S. Cl. 23—288                                12 Claims

ABSTRACT OF THE DISCLOSURE

The disclosure is of a fluid-treating catalyst having a metallic housing holding a ceramic body endowed with a plurality of unobstructed fluid flow paths between the inlet and outlet. Means can be provided between the housing and the ceramic body to heat insulate one from the other and to provide for resilient mounting of the ceramic body. Also, the arrangement of the insulating and resilient components blocks any substantial fluid flow path around the ceramic body and no substantial portion of this component is in contact with the housing. The ceramic body may be provided with adjacent metal plates and the resilient component can be placed between such plates and the housing. The heat-insulating component may be a ceramic of sufficient size to avoid loss of heat to the point where the catalyst temperature is lowered below that needed for conversion of the fluid being treated, and the resilient component may be disposed between the housing and the heat-insulating means. Also, the resilient means and the heat-insulating means may be a single member performing both functions. The device is particularly suitable for treating exhaust gases from automobiles and other gas streams.

---

This application is a continuation-in-part of application Ser. No. 256,856, filed Feb. 7, 1963, abandoned.

This invention is a novel means for holding a fragile ceramic element in a fluid flow line and in a particular aspect is drawn to a novel ceramic catalyst cartridge.

In dealing, for example, with the problem of treating exhaust gases from internal combustion engines, it has been proposed to treat such waste gases in the presence of catalytic materials in order to complete the combustion of partially oxidized fuel components, mostly carbon monoxide, which are to a great extent responsible for the obnoxious effects of automotive exhaust gases. It has further been proposed that shaped ceramic bodies impregnated or otherwise provided with catalytic material may be advantageously applied to the automotive exhaust problem to provide certain advantages to the technique. If a body of conventionally formed, pellet-type, catalyst is employed in an automotive exhaust line, a pressure-drop problem is created, which can substantially defeat the purpose of the catalytic treatment by creating back pressures in the exhaust line. The use of catalyst pellets also usually requires substantial contact of the pellets with metal screens or other supporting members. Commonly, in such devices, when there are large areas of metal-to-catalyst contact, considerable heat insulation is required to overcome the heat dissipation brought about by the metal, which results in low combustion temperatures, gas by-passing and catalyst deactivation. Such avoidance of substantial metal contacts is virtually impossible in any practical embodiment of devices employing catalyst which must be supported by screens or other metal members.

It has been discovered that a catalytically active ceramic element having relatively large, unobstructed paths for gas or other fluid flow can serve for catalytic treatment of, for instance, exhaust gas, without a substantial increase in pressure drop in the flow line or an increase in hold-up time because of the catalyst. This improved flow may, for example, employ, especially in cross-section, a substantially monolithic corrugated ceramic catalyst element having its corrugations arranged in a "honeycomb" fashion for through-passage of the gas or other fluid. The parallel, adjacent unidirectional, unobstructed flow paths or flow lines in the honeycomb structure may have cross-sections of any desired shape and cross-flow between these paths is usually prevented or practically non-existent for substantially the entire length.

The invention provides means for mounting a catalyst comprising a metallic housing having a fluid inlet and outlet, a ceramic catalyst element within said housing, said element providing a plurality of unobstructed fluid flow paths between an inlet face and an opposite outlet face and resilient and heat-insulating means between the catalyst element and housing and surrounding the catalyst element. The resilient and heat-insulating means performs several functions in devices which employ it. First the resilient and heat insulating means is arranged to block substantial passage of fluid between the catalyst element and the housing. Also, the heat insulating and resilient means holds the catalyst element out of contact with any substantial portion of the metallic housing. Thus the heat insulating and resilient means provides heat insulation between the catalyst element and the metallic catalyst housing which is provided, for instance, in the exhaust line. This metallic housing member would otherwise radiate heat to the atmosphere and conduct heat from the catalyst. The heat insulating and resilient means serves in two ways to prevent escape to the atmosphere of untreated gas. First, by actually blocking the passage between the catalyst element and the housing it prevents gas from avoiding catalyst contact. Secondly, by helping the catalyst element to maintain the temperature needed for the catalytic action the insulation prevents plugging, deactivation and the passage of gas through the catalyst untreated, such blow-by serving partially to defeat the purpose of the device in eliminating or at least minimizing the noxious gases sent to the atmosphere. Also, the insulating member provides for heating the catalyst faster to its optimum operating temperature.

As aforementioned, the heat insulating means substantially completely encloses or surrounds the sides of the catalyst element, except for the inlet and outlet faces. It may be made of an essentially rigid material which is impervious to gas flow and has a low heat transfer coefficient. Many ceramic or refractory oxide materials are known from which such heat insulating means may be fabricated, for example, fire-brick, cast alpha-alumina having air or other gas pockets, etc. The thickness of the means will depend upon the heat-insulating properties of the material, a sufficient thickness being employed to maintain activity throughout the catalyst element by preserving an operative temperature, for example no less than about 200° C. Also, the heat insulating members are sufficiently thick to prevent passage of gas between the catalyst element and the metal housing. Preferred thickness for the wall of the heat insulating means in an automobile engine exhaust gas treating system is about one-fourth to about three-fourths inches.

The shaped catalyst element comprises a film or coating of a refractory metal oxide on the external surface of a catalytically inert refractory material. The film usually contains a platinum group metal, such as Pt or Pd, either in metallic or oxidized state. The inert refractory support or carrier onto which the active refractory metal oxide film is deposited, is a solid, preferably unitary, body having a plurality of unobstructed openings therethrough in the direction of desired fluid flow and is preferably of a size that permits occupancy by the body of at least a major portion of the cross-sectional area of the reaction zone to be employed. Advantageously, the solid body is shaped to fit the reaction zone into which it is to be disposed, and this shape may be achieved by any convenient method, such as that disclosed in British Patent 882,484.

The support or carrier can be constructed of a substantially chemically-inert, rigid solid material capable of maintaining its shape and strength at high temperatures, for instance up to 1100° C. or more. The material may have a density of about 0.45 to 1.05 grams per cubic centimeter, preferably about 0.5 to 0.9 gram per cubic centimeter, and be unglazed; that is, the surface may be essentially entirely crystalline in form and marked by the absence of any significant amount of glassy or amorphous matrices, for instance, of the type found in porcelain materials. The support may be somewhat porous and contain large pores. Generally, the total surface area, that is, including the pores of the support or carrier, as distinguished from the apparent surface area, is below about 10 sq. meters/gram, more likely below about 1 sq. meter/gram. The superficial or apparent surface area of the carrier, including the walls of the openings, should be as large as is consistent with an acceptably low back pressure in the fluid flow system. Ordinarily in the treatment of auto exhaust gases, the volume of catalyst and the superficial surface area are adjusted to provide a back pressure of less than about 10 pounds/square inch and preferably less than about 5 pounds/square inch, at maximum acceleration. The superficial surface area will often be about 0.5 to 6, preferably 1 to 2.5 square meters/liter of support. Thus, the openings through the body can be of any shape and size consistent with the desired superficial surface and are large enough to permit free passage of the fluids to be reacted and to prevent plugging by particulate matter that may be present in the fluids as, for instance, lead compounds. These openings are generally parallel and extend through the support from one to the opposite side. The openings are usually separated from one another by walls defining the openings and, for most efficient operation, the openings are distributed across essentially the entire face or cross-section of the support subject to initial contact with the exhaust gas.

A preferred support or carrier is alpha-alumina and a more preferred support is zircon-mullite, although other similar chemically inert refractory materials can also be employed. Examples of other refractory material suitable as a support or carrier are, for instance, sillimanite, magnesium silicates, zircon, petalite, spodumene, cordierite, alumino-silicates, etc.

The thickness of the active refractory metal oxide layer or film on the support will vary depending upon the particular oxide employed but generally falls within the range of about 0.0001 to 0.005", preferably about 0.0004 to 0.001". The refractory metal oxides making up this coating or film deposited on the external surface of the support are characterized by a porous structure and possess a large internal pore volume and total surface area. Generally, the total surface area of the active refractory metal oxide film will be at least about 50 square meters/gram, preferably at least about 100 square meters/gram. Such oxides can be prepared by at least partially, preferably substantially completely, dehydrating the hydrate form of the oxide by calcination usually at temperatures of about 150 to 700° C. or somewhat more. The preferred active metal oxide films contain members of the gamma- or activated-alumina family which can be prepared, for instance, by precipitating a hydrous alumina gel and thereafter drying and calcining to expel hydrated water and provide the active gamma-alumina. A particularly preferred active refractory metal oxide is obtained by drying and calcining at temperatures of about 300 to 700° C. a mixture of precursor hydrous alumina phases predominating in crystalline trihydrate, that is, containing in excess of about 50% of the total alumina hydrate composition, preferably about 65 to 95% of one or more of the trihydrate forms gibbside, bayerite and nordstrandite (formerly called "randomite") as defined by X-ray diffraction. The substantial balance of the hydrate, i.e., at least 5%, preferably about 5 to 35%, may be amorphous hydrous or monohydrate (boehmite) alumina. Calcination of the precursor hydrous alumina is preferably controlled so that the gamma-alumina obtained contains monohydrate alumina in an amount substantially equivalent to that originally present in the mixture of the high trihydrate precursor hydrous alumina phases. Other suitable active metal oxides include for example active or calcined beryllia, zirconia, magnesia, thoria, silica, etc. and combinations of metal oxides such as boria-alumina, silica-alumina, etc. Preferably, the film is composed predominantly of oxides of one or more metals of Groups II, III and IV, having atomic numbers not exceeding 40.

The shaped ceramic catalyst element used in this invention may be made by the processes disclosed in copending Keith, Kenah and Bair application Ser. No. 256,819, filed Feb. 7, 1963, abandoned. This element is frequently inclined to be fragile and its mounting in an automobile vehicle, which is subjected to the stress of engine vibrations as well as the shock of road irregularities, often poses a problem in mounting the shaped catalyst. This invention also can provide means for such mounting which comprise a resilient means between the shaped ceramic element and the metal casing which is relatively rigidly mounted on the engine, automobile chassis, or other source of the gases to be treated.

The resilient means may be between the shaped ceramic element and the heat insulating means or between the heat insulating means and the metallic housing. A single member may be both a heat insulating means and resilient mounting means. Also, metal plates may be provided on at least two adjoining sides of the heat insulating means for withstanding the fastening stress of the holder. Generally, the catalyst element is mounted for horizontal disposition of the flow passages so that even if cracking of the element should occur, the pieces will not be caused by gravity to shift out of place.

This invention provides for the use of one or more of the ceramic catalyst elements in a fluid flow line. Where more than one element is used, the elements are in a fixed and predetermined relationship to each other and to the gas flow for example, the elements may be in parallel with respect to the fluid flow to insure a small pressure differential, or in series for more intensive treatment. In this latter situation catalyst elements differing in their type of catalytic activity may be employed. In general, in automotive applications the amount of catalyst used can be affected by various factors of engine operation such as gasoline consumption, load on the engine, etc., but in general the size of the element to be employed may vary with the size of the automotive engine, as measured in cubic inches of engine piston displacement. The amount of catalyst may be sufficient to provide about 15 to 200 square inches of superficial surface area per cubic inch of engine piston displacement; however, for passenger automobiles of the sizes most widely used in the United States of America about 20 to 80, preferably about 30 to 50 square inches of catalyst superficial surface area per cubic inch of engine piston displacement should be provided. The device of this invention offers a distinct improvement over pelleted catalyst systems which, according to U.S. Patent 3,024,593, need about 115 to 250 square inches of catalyst surface per cubic inch of engine displacement, generally exceeding 165 in.$^2$/in.$^3$, in American passenger cars.

The invention will be better understood by reference to the accompanying drawings which are to be considered illustrative only and not limiting. In the drawings:

FIGURE 1 is a side view of a flow line incorporating a catalytic cartridge which embodies the mounting means of this invention;

FIGURE 2 is a cross-sectional view along the line 2—2 of FIGURE 1 which schematically shows the relation of the cartridge to an automotive engine;

FIGURE 3 is a perspective view of the cartridge;

FIGURE 4 is a cross-sectional view along the line 4—4 of FIGURE 1;

Figure 5:
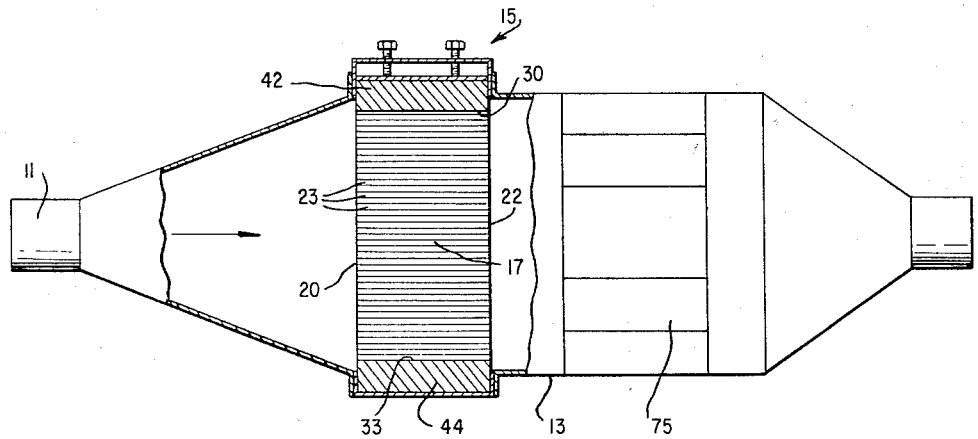
FIGURE 5 is a horizontal view partly in cross-section of an exhaust treating system which employs a catalyst element and a muffler.

In the figures the flow line 11 is provided, at any convenient position, with the enlarged portion 13 which contains the catalyst cartridge 15. This cartridge contains the operative ceramic element 17 which has its front face 20 and rear face 22 in open communication with the flow line. It will be observed that this monolithic element presents the unobstructed passageways 23 for gas flow directly from the front face to the rear face. Advantageously the exhaust line, upstream of the catalyst, will be provided with means for introducing molecular oxygen from an outside source to assist in the oxidation of exhaust gases. Such means may provide for the injection of, preferably, about 3 to 50% air based on exhaust gas volume. Such means may also provide for introducing volumes of air in the upper portion of this range during automotive engine idling and lower volumes during acceleration and cruising of the vehicle. Also, if desired, means may be included for preheating the air by means of heat exchange with an engine 24 or other portions of an exhaust system.

The "dead" side faces 25 and 27 and the "dead" top and bottom faces 30 and 33 are covered by the ceramic block frame members 36, 39, 42 and 44. It will be noted that these ceramic block members substantially completely enclose the dead sides of the catalyst element, but the juncture of the side members with the bottom member may be "loose" enough to provide the slightly "open" junctures 45 and 46 which allow for tightening of the frame during use of the device, should the catalyst element shrink slightly. At least two adjacent "dead" sides of the catalyst block are preferably covered by metal plates. In the drawing, these are the side ceramic block frame member 36 and the bottom member 44, which are covered by the metal plates 48 and 50, respectively, but the metal-covered members may be either side member and a block selected from the top and bottom members, or three or four of these members. Any convenient means may be provided to hold the metal plates against the ceramic block insulating members and when the catalyst is in place in the casing the ceramic frame is interposed between the catalyst element 17 and the metallic elements, thereby preventing any metal-to-catalyst contact.

As can be seen in the drawings, the end caps 52 and 55 which are part of the flow line 11, comprise the two side portions of the holder. In order to provide resilience, the modification of FIGURE 2 provides the flat spring 58 to separate metal plate 50 from end cap 52. Tension on spring 58, or equivalent coil springs which may be used, is regulated by the studs 60, 66, etc., which secure the cartridge to the holder, passing through the holder and keeping the ceramic device firmly in place while allowing enough resilience to avoid breaking the shaped element when it is subjected to vibrations and shocks. It will be noted that these springs are provided in a portion of the casing which is substantially cut off from the flow of waste gas by the ceramic frame member which fits snugly within the metal casing. In the modification shown in FIGURE 4, the resilient member is used between the operative shaped ceramic element and the ceramic frame. In such a situation the resilient member may comprise the padding 72 made by a refractory fiber such as an aluminum silicate, basalt, glass or asbestos, which is placed on at least two "dead" sides of the ceramic element, namely the opposite sides of the ceramic frame members which bear the metal plates 48 and 50. The resilient padding when entirely surrounding the catalyst element could also serve as the insulating means and the block frame members 36, 39, 42 and 44 be omitted if desired.

FIGURE 5 shows a modification wherein the catalyst cartridge may be included in the same compartment with a muffler 75 or other mechanism for sound deadening or cooling of the exhaust gases. The catalytic element in such situations is preferably placed upstream of the muffler.

Figure 6:
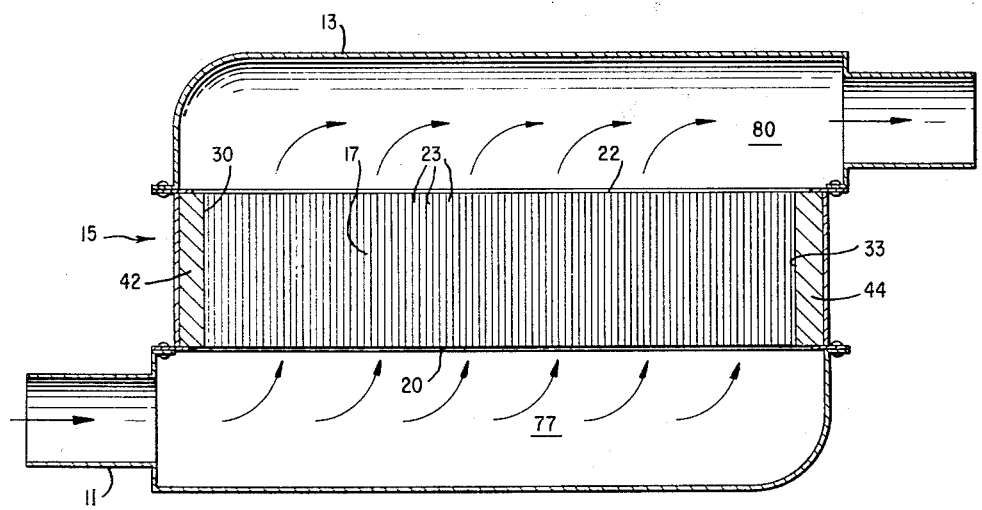
FIGURE 6 is a horizontal cross-sectional view of another type of exhaust mechanism which may employ the catalyst cartridge of this invention.

In FIGURE 6 the catalyst compartment is of flattened configuration to provide a longer catalyst element. This element may, for example, be comprised of two catalyst elements the size of those in the other modifications in parallel in the flow line in a single cartridge. In this modification the configuration of the catalyst chamber provides an inlet section 77 for tangential or skimming distribution of the exhaust gas over the face 20 of the catalyst element before penetration and also provides the elongated outlet section 80 for tangential or skimming collection of the treated exhaust gas.

Sections 77 and 80 are preferably rounded on their sides away from the catalyst. As seen from the front or rear of an automobile the device would be almost elliptical in appearance. This curved design adds to the strength of the assembly, eliminating the weakness and noisiness characteristic of flat sheet metal construction. As shown, the inlet and outlet sections 77 and 80 overlap each other with the catalyst element extending the length of the overlap, as further described in copending Keith, Schreuders and Bair application Ser. No. 256,930, filed Feb. 7, 1963, abandoned, and incorporated herein by reference. In this embodiment, also, provision can be made for ready removal and replacement of the entire unitary catalyst as a cartridge.

The catalyst device of this invention gives efficient treatment of waste gases without developing a significant back pressure in the exhaust line. For example, a catalyst element 6″ high by 6″ wide by 3″ in the direction of gas flow installed in a chamber similar to that of FIGURES 1 and 2 in an automobile exhaust line gave less than one p.s.i. back pressure at an engine speed of 4000 r.p.m. under road load conditions as compared to 3.5 to 9 p.s.i. back pressure developed in conventional automobile mufflers.

The device of FIGURE 6 is especially conservative of space and can be made in sizes as small as about 8″ in length (the direction of inlet gas flow) up to about 36″, while the height need be no more than about 8″ and is usually at least about 2″. The width of the treating device modification of FIGURE 6, i.e., the length of the gas flow passages plus the width of the inlet and outlet sections may be no more than about 16″ or even may be no more than about 10″. This device will usually be at least about 5″ wide and preferably will be about 10″ to 30″ long and 3″ to 6″ high. The height and width of the catalyst element itself in this embodiment will in general each be at least about 1" and will not exceed about 6". Usually the maximum height and width will be about 3". The length of the element may vary from about 6" to 34", and a catalyst cartridge about 12" long by 3" wide by 3" high is particularly suitable for the smaller "compact" cars.

It can readily be seen that the provision of a ceramic or other heat-insulating frame around the dead sides of the catalyst element prevents heat loss due to contact of the catalyst with metal, and also avoids the need for constructing the holder from special expensive corrosion-resistant metals such as stainless steel. The snug fitting of the insulation within the metal casing prevents the gas to be treated from by-passing the unitary shaped ceramic element. Also, a shaped fragile ceramic element may be mounted in a holder by interposing a resilient member between the element and the holder, enclosing four sides of the element with a ceramic or other refractory heat-insulating frame and using holding means, for instance studs, which pass through the holder, to transmit to metal plates, which cover at least two adjacent sides of the frame a pressure sufficient to tension the resilient member. It also can be seen that a ceramic element having catalytic properties may be provided in quickly replaceable form for use in an exhaust line by enclosing the dead sides of the element with the ceramic frame. The members which make up the ceramic frame may be held together by any mechanical, adhesive or cohesive means suitable for resisting the effect of high temperatures preferably while allowing a slight resilience. The removable cartridge preferably includes a heat-resistant resilient member, for example, metal springs on the outside of the metal plates or "Fiberfrax" padding between the ceramic frame and the catalytic element.

It is claimed:

1. A catalyst cartridge comprising a metallic housing having a fluid inlet and outlet, a ceramic unitary catalyst element within said housing, said element providing a plurality of unobstructed fluid flow paths between an inlet face and an outlet face, heat-insulating means between said catalyst element and said housing and surrounding said catalyst element, said heat-insulating means being arranged to block substantial passage of fluid between said catalyst element and said housing, said heat-insulating means holding said catalyst element out of contact with any substantial portion of said housing, and spring resilient means between said heat-insulating means and said housing for resiliently mounting said catalyst element with respect to said housing.

2. The catalyst cartridge of claim 1 wherein the heat-insulating means is of ceramic.

3. The catalyst cartridge of claim 1 in which the fluid inlet and outlet of the metallic housing are each formed by a tube whose longitudinal axis is perpendicular to said fluid flow paths.

4. A catalyst cartridge for insertion in a gas flow line having a metallic catalyst-housing intermediate a gas inlet and a gas outlet comprising a unitary ceramic catalyst element and a ceramic frame, said element providing a plurality of unobstructed substantially parallel unidirectional gas flow paths between an inlet face and an opposite outlet face, said frame substantially completely surrounding the sides of said catalyst element other than said faces, and being a gas impervious, heat-insulating ceramic sufficient in size to prevent contact of said housing with said element, to avoid such loss of heat from said element to said housing that the catalyst temperature is lowered below gas conversion temperature and to block passage of gas between said element and said housing, and metal plates on at least two adjacent sides of said frame for securing said cartridge to said housing.

5. A catalyst cartridge for insertion in a gas flow line subject to vibration and having a metallic catalyst-housing intermediate a gas inlet and a gas outlet comprising a unitary ceramic catalyst element, a ceramic frame, metal plates on at least two adjacent sides of said frame, and resilient means between the said element and said housing, said element providing a plurality of unobstructed substantially parallel unidirectional gas flow paths between an inlet face and an opposite outlet face, said frame substantially completely surrounding the sides of said catalyst element other than said faces, and being a gas impervious, heat-insulating ceramic sufficient in size to prevent contact of said housing with said element, to avoid such loss of heat from said element to said housing that the catalyst temperature is lowered below gas conversion temperature and to block passage of gas between said element and said housing, said housing being provided with means for securing said frame to said housing by means of the said metal plates.

6. A catalyst cartridge for insertion in a gas flow line subject to vibration and having a metallic catalyst-housing intermediate a gas inlet and a gas outlet comprising an unitary ceramic catalyst element, a ceramic frame, metal spring resilient means between the said ceramic frame and said housing, said element providing a plurality of unobstructed substantially parallel unidirectional gas flow paths between an inlet face and an opposite outlet face, said frame substantially completely surrounding the sides of said catalyst element other than said faces, and being a gas impervious, heat-insulating ceramic sufficient in size to prevent contact of said housing with said element, to avoid such loss of heat from said element to said housing that the catalyst temperature is lowered below gas conversion temperature and to block passage of gas between said element and said housing.

7. In a device of the type described a gas flow line having a metallic catalyst-housing intermediate a gas inlet and a gas outlet, a ceramic unitary catalyst element within said housing, said element providing a plurality of unobstructed, substantially parallel, unidirectional flow paths between an inlet face and an opposite outlet face, heat-insulating means between said catalyst element and said housing and surrounding said catalyst element, said heat-insulating means being arranged to block substantial passage of fluid between said catalyst element and said housing, said heat-insulating means holding said catalyst element out of contact with any substantial portion of said housing, and metal spring resilient means between said heat-insulating means and said housing for resiliently mounting said catalyst element with respect to said housing.

8. The device of claim 7 wherein the resilient means is disposed between said housing and said heat insulating means.

9. The catalyst cartridge of claim 7 in which the gas inlet and outlet of the metallic housing are each formed by a tube whose longitudinal axis is perpendicular to said flow paths.

10. A catalyst cartridge comprising a metallic housing having a fluid inlet and outlet, a ceramic catalyst element within said housing, said element providing a plurality of unobstructed fluid flow paths between an inlet face and an outlet face, resilient and heat-insulating means between said catalyst element and said housing and surrounding said catalyst element, said resilient and heat-insulating means being arranged to block substantial passage of fluid between said catalyst element and said housing, said heat-insulating and resilient means holding said catalyst element out of contact with any substantial portion of said housing, and metal plates on at least two adjacent sides of said heat-insulating means for securing said catalyst in said housing.

11. The catalyst cartridge of claim 10 wherein the resilient means are provided between said plates and said housing.

12. The catalyst cartridge of claim 10 wherein the resilient means is disposed between said housing and said heat-insulating means.

(References on following page)

References Cited

UNITED STATES PATENTS

| | | | |
|---|---|---|---|
| 2,387,454 | 10/1945 | Marisic | 252—477 X |
| 2,853,368 | 9/1958 | Adey | 23—288 |
| 3,065,595 | 11/1962 | Gary. | |
| 3,088,271 | 5/1963 | Smith. | |
| 3,094,394 | 6/1963 | Innes et al. | 23—288 |
| 3,109,715 | 11/1963 | Johnson et al. | 23—288 |
| 3,172,251 | 3/1965 | Johnson | 23—288 X |
| 3,211,534 | 10/1965 | Ridgway | 23—288 X |

JOSEPH SCOVRONEK, *Primary Examiner.*

U.S. Cl. X.R.

252—466, 477